US006382203B1

(12) United States Patent
Kim et al.

(10) Patent No.: US 6,382,203 B1
(45) Date of Patent: May 7, 2002

(54) FURNACE WITH COMBUSTION AIR-COOLED DRAFT INDUCER FAN

(75) Inventors: Seung-Ho Kim, Fort Smith; Carl O. Howerton, Jr., Alma; Joey W. Huffaker, Rudy, all of AR (US)

(73) Assignee: Rheem Manufacturing Company, New York, NY (US)

( * ) Notice: Subject to any disclaimer, the term of this patent is extended or adjusted under 35 U.S.C. 154(b) by 3 days.

(21) Appl. No.: 09/650,852

(22) Filed: Aug. 29, 2000

(51) Int. Cl.$^7$ ................................................. F24H 3/02
(52) U.S. Cl. ................................ 126/110 R; 126/99 D; 126/116 R; 310/63; 165/47
(58) Field of Search .................. 126/110 R, 110 A, 126/110 AA, 116 R, 99 D, 99 R, 85 B, 312; 310/58, 62, 63, 52, 85, 86; 417/368, 423.8; 165/47, 48.1; 110/162

(56) References Cited

U.S. PATENT DOCUMENTS

| | | | | |
|---|---|---|---|---|
| 2,454,296 A | * | 11/1948 | Woods ..................... | 126/116 R |
| 2,877,724 A | | 3/1959 | Arvintz et al. .............. | 110/162 |
| 3,782,303 A | | 1/1974 | Pfister et al. ............... | 110/162 |
| 4,533,315 A | * | 8/1985 | Nelson ........................ | 431/20 |
| 4,951,651 A | | 8/1990 | Shellenberger ......... | 126/116 R |
| 5,040,943 A | | 8/1991 | Dwyer et al. ................. | 415/26 |
| 5,070,772 A | | 12/1991 | Guzorek ..................... | 454/16 |
| 5,105,798 A | | 4/1992 | Evens .................... | 126/110 R |
| 5,293,860 A | * | 3/1994 | Tomlinson et al. ..... | 126/110 R |
| 5,313,930 A | * | 5/1994 | Kujawa et al. ......... | 126/116 R |
| 5,375,651 A | | 12/1994 | Colwell ....................... | 165/47 |
| 6,223,740 B1 | * | 5/2001 | Kim et al. ............. | 126/110 R |

FOREIGN PATENT DOCUMENTS

| | | | |
|---|---|---|---|
| GB | 1 426 728 A | * | 3/1976 |
| JP | 55-147942 A | * | 11/1980 |
| JP | 5-248630 A | * | 9/1993 |

* cited by examiner

*Primary Examiner*—Henry Bennett
*Assistant Examiner*—Josiah C. Cocks
(74) *Attorney, Agent, or Firm*—Konneker & Smith, P.C.

(57) ABSTRACT

A fuel-fired, forced draft air heating furnace is provided with a draft inducer fan structure which substantially reduces the operational noise of the furnace. The draft inducer fan is disposed within a sealed burner vestibule area of the furnace and is provided with an auxiliary fan blade structure mounted on its drive shaft in a spaced relationship with its main fan impeller. The auxiliary fan blade structure and the fan motor are disposed within an open-ended air transfer duct structure coupled to an air inlet opening in an exterior wall portion of the vestibule. During operation of the draft inducer fan, combustion air is drawn inwardly through the transfer duct structure, across the inducer fan motor, and into the vestibule for supply to the furnace burner section. The use of the transfer duct structure and auxiliary fan blade structure serves to cool the fan motor, preheat the combustion air, and reduce the overall operational noise of the furnace. A baffle plate member is placed in a shielding relationship with the burner structure to inhibit burner flame flickering that might otherwise be caused by combustion air impingement with the burner flames.

17 Claims, 3 Drawing Sheets

FURNACE WITH COMBUSTION AIR-COOLED DRAFT INDUCER FAN

BACKGROUND OF THE INVENTION

The present invention generally relates to fuel-fired heating appliances and, in a preferred embodiment thereof, more particularly relates to a fuel-fired furnace having incorporated therein a specially designed draft inducer fan cooled during operation thereof by combustion air being flowed to the burner portion of the furnace.

Various types and sizes of fuel-fired air heating appliances are provided with draft inducer fans which are communicated with the interior of the heat exchanger portion of the appliance and serve to forcibly expel combustion gases therefrom and deliver the expelled combustion gases to a vent stack structure operatively coupled to the appliance. For example, in conventional forced draft, fuel-fired air heating furnaces the draft inducer fan is often located within the burner vestibule area of the furnace, with the negative pressure created in the vestibule area by the inducer fan being utilized to draw combustion air into the vestibule, via louvers or other openings in a wall portion of the vestibule, for delivery to the burners in the vestibule.

This conventional forced draft furnace construction carries with it several well known problems, limitations and disadvantages. For example, the essentially uncontrolled entry of combustion air into the burner vestibule area can undesirably cause flickering of the burner flames. Additionally, it is often the case that an undesirable level of burner and inducer fan operational noise is transmitted to areas near the furnace via the necessary louvers or other openings in the vestibule outer wall structure. Further, because the inducer fan is located in the enclosed vestibule area its motor can often be subjected to undesirably high operating temperatures.

AS can be seen from the foregoing, a need exists, in fuel-fired, forced draft furnaces and other types of fuel-fired, forced draft heating appliances, for an improved draft inducer design and use which eliminates or at least substantially reduces the above-mentioned problems, limitations and disadvantages. It is to this need that the present invention is directed.

SUMMARY OF THE INVENTION

In carrying out principles of the present invention, in accordance with a preferred embodiment thereof, a fuel-fired, forced draft heating appliance, representatively an air heating furnace, is provided and has a chamber having an exterior wall with an air intake opening therein, a heat exchanger, and a fuel burner disposed in the chamber and operative to create hot combustion products in the heat exchanger.

A draft inducer fan is disposed in the chamber, has a motor, and is operative to forcibly expel flue gas from the heat exchanger. An air transfer housing structure extends through a portion of the chamber and is interconnected between the air intake opening and the motor. During operation of the furnace, the draft inducer fan creates within the chamber a negative pressure that draws combustion air into the chamber, for delivery to the fuel burner, sequentially through the air intake opening, through the interior of the air transfer housing structure, and against the motor in a manner cooling the motor and being preheated by the motor prior to delivery to the fuel burner within the chamber.

This use of the specially designed draft inducer fan apparatus with its air transfer housing portion substantially reduces burner and inducer fan noise escaping from the chamber, lowers the operating temperature of the inducer fan motor, and improves combustion efficiency via the preheating of the incoming combustion air.

According to another feature of the invention, an auxiliary fan blade structure is anchored to the inducer fan motor drive shaft for rotation therewith and, like the fan motor, is at least partially disposed within the interior of the air transfer housing. During furnace operation, driven rotation of this auxiliary fan blade structure serves to turbulate the combustion air interiorly traversing the air transfer housing structure and thereby facilitate heat exchange contact between the incoming combustion air and the inducer fan motor.

According to a further aspect of the invention, a baffle member is disposed within the chamber and is operative to inhibit flicker-creating impingement against the burner flame by the incoming combustion air exiting the air transfer housing structure. Representatively, the baffle member is a baffle plate secured to a support frame portion of the overall burner structure, and is interposed between the fuel burner and the outlet opening of the air transfer housing structure.

While principles of the invention are representatively illustrated and described herein as being incorporated in a fuel-fired, forced draft air heating furnace, it will be readily appreciated by those of ordinary skill in this particular art that such principles could also be advantageously utilized in a variety of other types of fuel-fired, forced draft heating appliances as well, and are not limited to being applied to furnaces.

DETAILED DESCRIPTION

Figure 1:
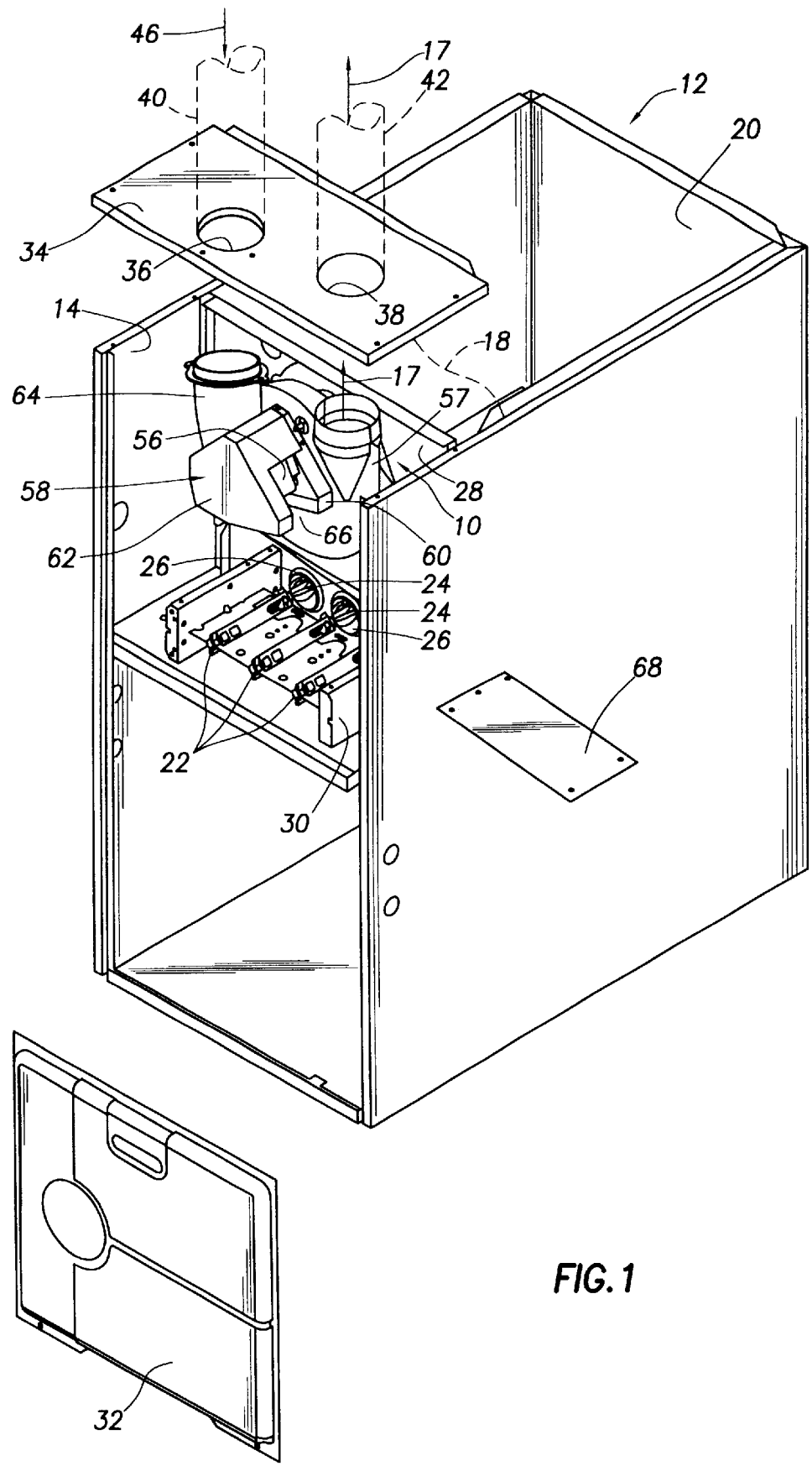
FIG. 1 is a partially exploded perspective view of a representative fuel-fired, forced draft air heating furnace having incorporating therein a specially designed draft inducer fan structure embodying principles of the present invention.
Figure 2:
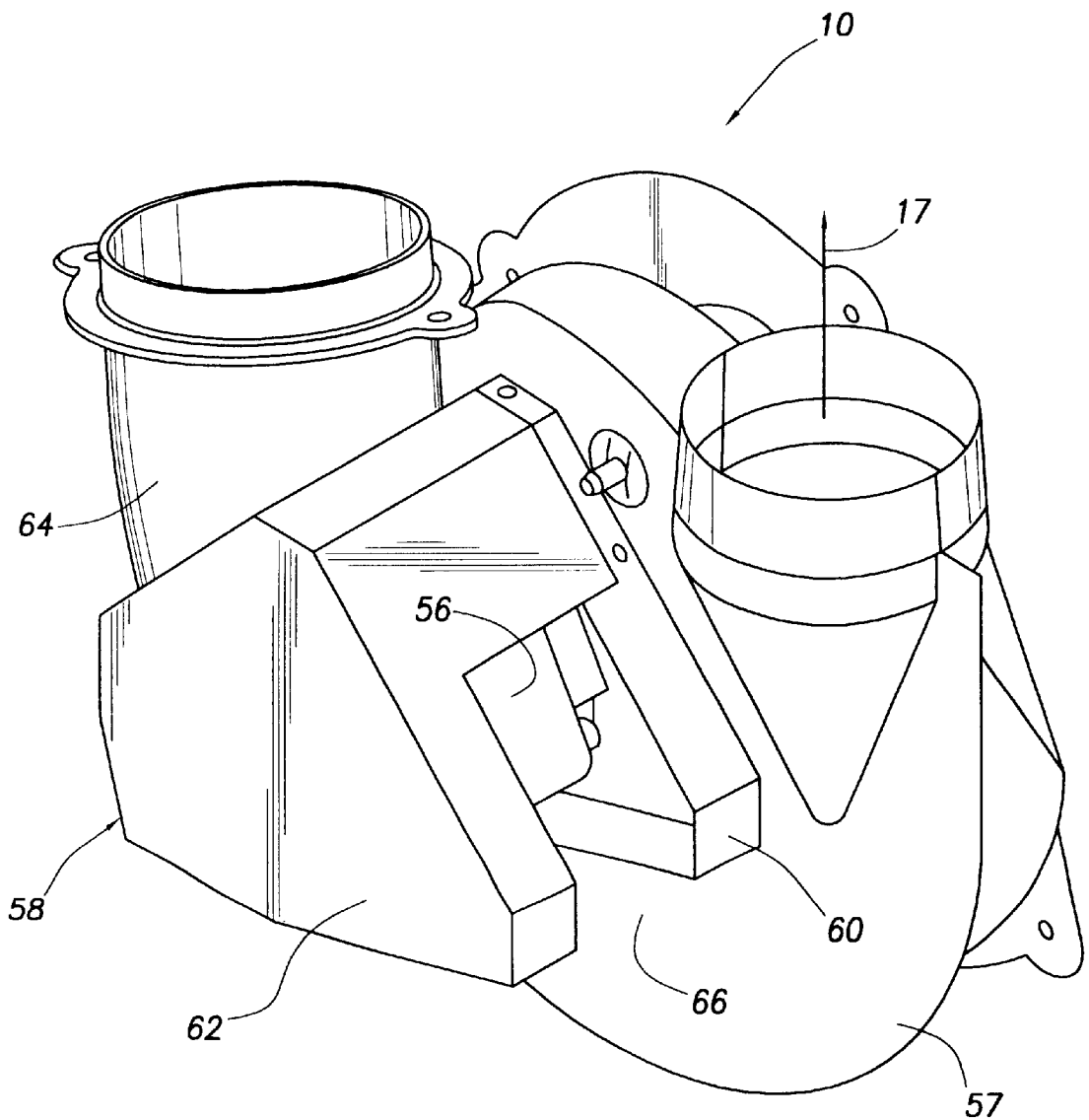
FIG. 2 is an enlarged scale perspective view of the draft inducer fan structure removed from the furnace.
Figure 3:
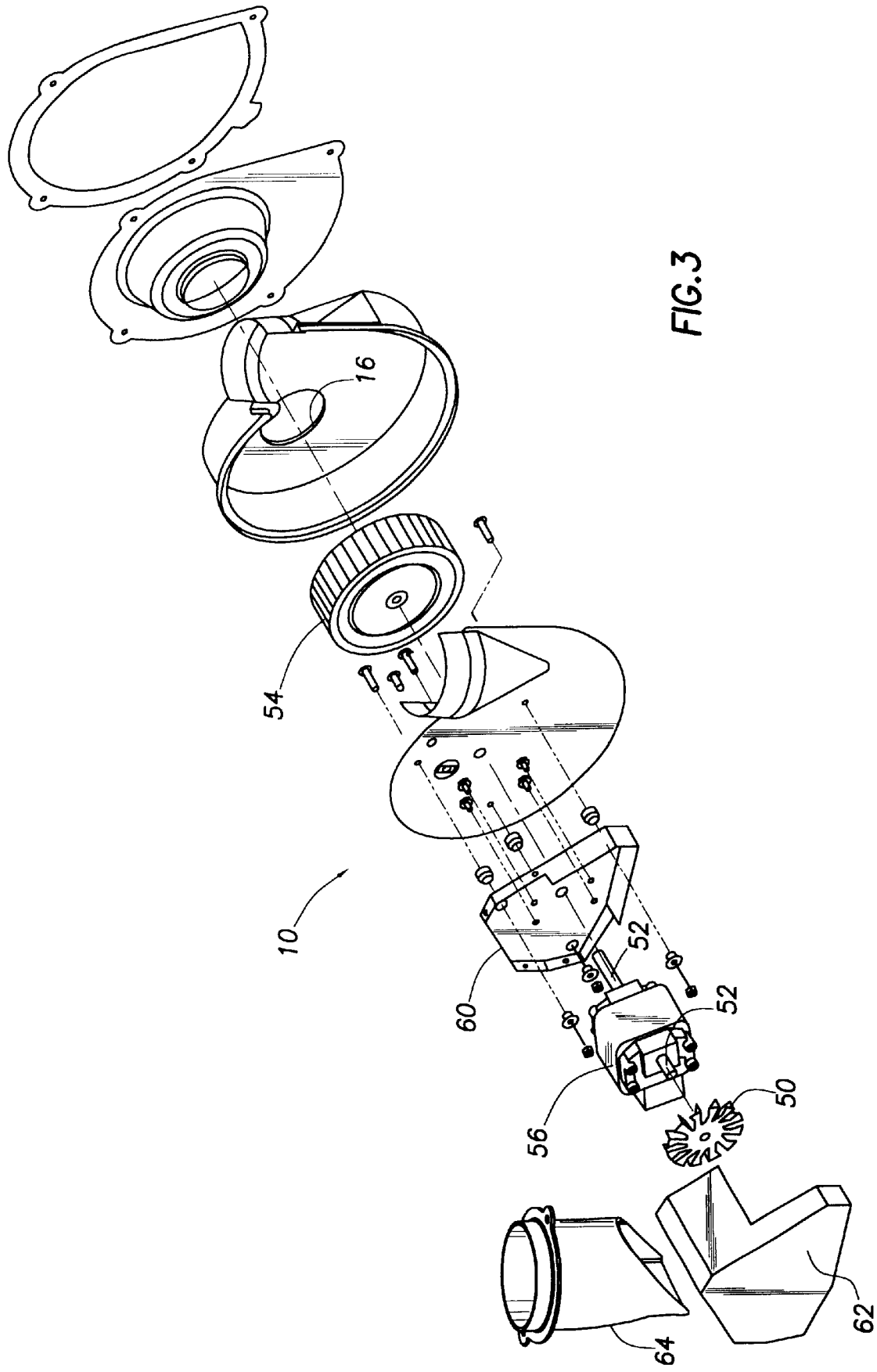
FIG. 3 is an exploded perspective view of the draft inducer fan structure.

AS illustrated in FIGS. 1–3, this invention provides a specially designed draft inducer fan 10 which is incorporated in a fuel-fired, forced draft air heating furnace 12. The fan 10 is disposed in a sealed burner vestibule chamber 14 of the furnace 12 and has an inlet opening 16 (see FIG. 3) communicated with a fuel-fired heat exchanger 18 (a portion of which is schematically depicted in phantom in FIG. 1) operatively positioned in an air heating chamber 20 located behind the burner vestibule 14. Inshot-type fuel burners 22, positioned within the burner vestibule 14, inject flames 24 through openings 26 in the rear vestibule wall 28 into the interior of the heat exchanger 18, and are supported in a frame structure 30 shown in FIG. 1. At the same time, a main supply fan (not shown) disposed beneath the heat exchanger 18 within the air heating chamber 20 forces air upwardly through the heating chamber 20 and externally across the heat exchanger 18 therein. This heats the air, which is then appropriately flowed, via the upper end of the heating chamber 20, to a conditioned space served by the furnace 12.

The burner vestibule chamber 14 is sealed off by a removable, unperforated front chamber wall 32 and a removable top chamber wall 34 having air intake and flue gas discharge openings 36,38 therein. AS illustrated in phantom in FIG. 1, a combustion air intake duct 40 is secured to and extends upwardly from the top chamber wall opening 36, and a vent stack 42 is secured to and extends upwardly from the top chamber wall opening 38. The intake duct 40 and the vent stack 42 are suitably extended from the furnace 12 to outside the building in which the furnace is disposed.

During firing of the furnace 12, the draft inducer fan 10 operates to exhaust spent flue gases from the heat exchanger 18 and discharge the flue gases 17 sequentially through the top chamber wall opening 38 and the vent stack 42. The operation of the fan 10 creates a negative pressure within the burner vestibule chamber 14. This negative pressure draws combustion air 46 inwardly through the air inlet duct 40, through the top wall opening 36, and into the vestibule chamber 14 to supply the combustion air 46 to the fuel burners 22 as later described herein.

In conventional fuel-fired, forced draft furnaces of this general type, louvers are formed in the front chamber wall 32 to permit ambient air from adjacent the furnace 12 to be drawn into the vestibule 14 to supply combustion air to the burners 22, as well as to supply cooling air to the draft inducer fan motor. This conventional practice undesirably permits a substantial amount of draft inducer fan and burner noise to escape outwardly through the vestibule wall louvers, and also can result in the incoming combustion air causing the burner flames to flicker at times. Moreover, the motor of the draft inducer fan, because it is disposed within the enclosed vestibule area, may tend to operate at an undesirably high temperature.

These problems of conventional draft inducer fans in this particular application are solved or at least substantially reduced by the present invention in the following manner. AS illustrated in FIGS. 1-3, an auxiliary circular fan blade 50 (see FIG. 3) is connected to the fan drive shaft 52, in an axially spaced relationship with the fan's main impeller wheel 54 thereon, outboard of the fan motor 56. Fan motor 56 projects outwardly from a side of the inducer fan housing 57 (see FIG. 2) in which the impeller wheel 54 (see FIG. 3) is rotatable disposed. Auxiliary fan blade structure 50 and the inducer fan motor 56 are enclosed with an air transfer housing structure 58 formed from a motor mounting plate 60, an air deflector 62, and an air inlet duct 64. The assembled air transfer housing structure 58 has an open bottom area 66. The open upper end of the air inlet duct 64 is secured to the underside of the top vestibule chamber wall 34 over its air intake opening 36.

During operation of the draft inducer fan 10, the negative pressure that it creates within the burner vestibule chamber 14 draws outside combustion air 46 into the vestibule chamber 14, for supply to the burners 22, sequentially through the air intake duct 40, the air intake opening 36 in the top chamber wall 34, and the air transfer housing structure 58. As the air 46 passes through the air transfer housing structure 58 it contacts and cools the fan motor 56. The rotating auxiliary fan blade structure 50 within the housing structure 58 serves to create turbulence in the air 46 therein to enhance the cooling of the motor 56 by the air 46 as it passes through the housing structure 58. Representatively, the rotationally driven auxiliary fan blade structure 50 does not appreciably contribute to the air flow through the housing structure 58—this function is primarily provided by the negative pressure created in the vestibule chamber 14 by the draft inducer fan 10.

The use of the air transfer housing structure 58, coupled with the wall sealing of the vestibule chamber 14, helps to reduce the transfer of inducer fan operating noise outwardly from the vestibule area 14 to areas near the furnace 12, and also provides for lower draft inducer fan motor operating temperatures by causing essentially all of the incoming combustion air 46 to pass directly across the motor 56, thereby cooling its heat-generating bearing and winding portions. Additionally, the incoming combustion air 46 is desirably preheated by its contact with the fan motor 56 prior to the delivery of the combustion air to the burners 22.

After the combustion air 46 is flowed along the draft inducer fan motor 56, it downwardly exits the air transfer housing structure bottom side opening 66 toward the underlying burners 22. To prevent this exiting air 46 from directly impinging on the burner flames 22, a baffle plate 68 (shown in FIG. 1 removed from the furnace 12) is appropriately secured to the frame structure 30 over the burners 22 within the burner vestibule chamber 14. The installed baffle plate 68 operates to prevent potentially disruptive direct downward impingement of the incoming combustion air 46 on the burner flames 24.

Although the combustion air 46 delivered to the burners 22 is preferably routed from outside the building to the vestibule chamber 14 via the air intake duct 40, the duct 40 could be eliminated if desired so that indoor combustion air from adjacent the furnace 12 could be flowed into the vestibule chamber 14 for supply to the burners 22. Burner and draft inducer fan noise transmitted to areas near the furnace 12 would still be substantially reduced, compared to forced draft furnaces of conventional construction, due to the use of the air transfer housing structure 58 which serves to attenuate the level of burner and inducer fan noise transmitted outwardly through the top chamber wall opening 36.

While principles of the present invention have been representatively illustrated and described herein as being incorporated in a fuel-fired, forced draft air heating furnace, it will be readily appreciated by those of ordinary skill in this particular art that such principles could also be advantageously utilized in a variety of other types of fuel-fired, forced draft heating appliances as well, and are not limited to being applied to furnaces.

The foregoing detailed description is to be clearly understood as being given by way of illustration and example only, the spirit and scope of the present invention being limited solely by the appended claims.

What is claimed is:

1. A fuel-fired, forced draft heating appliance comprising:
   a chamber having an exterior wall with an air intake opening therein;
   a heat exchanger;
   a fuel burner disposed in said chamber and operative to create hot combustion products in said heat exchanger;
   a draft inducer fan disposed in said chamber, having a motor, and being operative to forcibly expel flue gas from said heat exchanger; and
   an air transfer structure extending through said chamber, having an interior flow passage, and being interconnected between said air intake opening and said motor, operation of said draft inducer fan creating within said chamber a negative pressure that draws combustion air into said chamber, for delivery to said fuel burner, sequentially through said air intake opening, through said interior flow passage, and against said motor in a manner cooling said motor and being preheated by said motor prior to delivery to said fuel burner.

2. The heating appliance of claim 1 wherein said heating appliance is an air heating furnace.

3. The heating appliance of claim 2 wherein said air heating furnace is a gas-fired heating furnace.

4. The heating appliance of claim 1 wherein said fuel burner is an inshot-type fuel burner.

5. The heating appliance of claim 1 wherein:
   said draft inducer fan includes a shaft rotationally drivable by said motor, and a fan blade structure carried on and rotationally drivable by said shaft, and
   said fan blade structure and said motor are at least partially disposed within said interior flow passage in adjacency with one another,
   said fan blade structure, during rotation thereof, being operative to turbulate combustion air traversing said interior flow passage and facilitate its contact with said motor.

6. A fuel-fired, forced draft heating appliance comprising:
   a chamber having an exterior wall with an air intake opening therein;
   a heat exchanger;
   a fuel burner disposed in said chamber and operative to create hot combustion products in said heat exchanger;
   a draft inducer fan disposed in said chamber, having a motor, and being operative to forcibly expel flue gas from said heat exchanger;
   an air transfer structure extending through said chamber, having an interior flow passage, and being interconnected between said air intake opening and said motor, operation of said draft inducer fan creating within said chamber a negative pressure that draws combustion air into said chamber, for delivery to said fuel burner, sequentially through said air intake opening, through said interior flow passage, and against said motor in a manner cooling said motor and being preheated by said motor prior to delivery to said fuel burner; and
   a baffle structure positioned adjacent said fuel burner and being operative to shield said fuel burner from flicker-creating impingement by combustion air discharged from said interior flow passage for delivery to said fuel burner.

7. The heating appliance of claim 6 wherein:
   said fuel burner is carried by a frame, and
   said baffle structure includes a plate member mounted on said frame.

8. The heating appliance of claim 7 wherein:
   said fuel burner is positioned beneath said draft inducer fan within said chamber, and
   said plate member is mounted on a top side portion of said frame above said fuel burner.

9. A method of operating a fuel-fired, forced draft heating appliance including a chamber having an exterior wall with an air intake opening therein, a heat exchanger, a fuel burner disposed in said chamber and operatively associated with said heat exchanger, and a draft inducer fan disposed in said chamber, having a motor, and being operative to forcibly expel flue gas from said heat exchanger, said method comprising the steps of:
   providing an enclosed combustion air passage extending through a portion of said chamber between said air intake opening and said motor, and, during operation of said heating appliance:
   cooling said motor, and supplying preheated combustion air to said fuel burner, by sequentially flowing combustion air into said air intake opening, through said combustion air passage, against said motor, and outwardly from said enclosed combustion air passage.

10. The method of claim 9 wherein:
    said providing step includes the step of interconnecting an air transfer duct structure between said air intake opening and said motor.

11. The method of claim 9 wherein:
    said cooling step includes the step of using said draft inducer fan to create within said chamber a negative pressure which operatively draws combustion air through said enclosed combustion air passage.

12. The method of claim 9 wherein said motor is drivingly coupled to a shaft, and said cooling step includes the steps of:
    connecting a fan blade structure to said shaft, adjacent said motor, for driven rotation by said shaft, and
    using the rotational driven fan blade structure to turbulate combustion air adjacent said motor.

13. A method of operating a fuel-fired, forced draft heating appliance including a chamber having an exterior wall with an air intake opening therein, a heat exchanger, a fuel burner disposed in said chamber and operatively associated with said heat exchanger, and a draft inducer fan disposed in said chamber, having a motor, and being operative to forcibly expel flue gas from said heat exchanger, said method comprising the steps of:
    providing an enclosed combustion air passage extending through a portion of said chamber between said air intake opening and said motor, and, during operation of said heating appliance:
    cooling said motor, and supplying preheated combustion air to said fuel burner, by sequentially flowing combustion air into said air intake opening, through said combustion air passage, against said motor, and outwardly from said enclosed combustion air passage,
    said fuel burner, during operation thereof, generating a flame exposed to said chamber, and
    said method further comprising the step of shielding said flame from flicker-creating impingement thereon by combustion air delivered to said fuel burner.

14. The method of claim 13 wherein:
    said shielding step includes the step of interposing a baffle member between said fuel burner and said draft inducer fan.

15. A draft inducer fan for use with a fuel-fired heating appliance, comprising:

a hollow body having an inlet, an outlet, and an outer side portion;

an impeller disposed within said hollow body;

a motor projecting outwardly from said outer side portion;

a drive shaft coupled to said motor and drivingly coupled to said impeller;

an auxiliary fan blade structure drivably coupled to said drive shaft adjacent said motor; and an air transfer housing structure having spaced apart inlet and outlet openings and an interior in which said motor and said auxiliary fan blade structure are at least partially disposed, said air transfer housing structure permitting combustion air to be flowed therethrough between said inlet and outlet openings to contact, cool and be preheated by said motor, said auxiliary fan blade structure, during driven rotation thereof, functioning to turbulate combustion air passing through said air transfer housing structure in a manner facilitating heat exchange contact between the combustion air and said motor.

16. The draft inducer fan of claim 15 wherein:

said auxiliary fan blade structure is positioned on said drive shaft outboard of said motor.

17. The draft inducer fan of claim 15 wherein said draft inducer fan is an air heating furnace draft inducer fan.

* * * * *